United States Patent
Nakane

[11] 3,766,469
[45] Oct. 16, 1973

[54] CAPACITANCE AND LOSS TANGENT MEASURING APPARATUS

[75] Inventor: Hisao Nakane, Tokyo, Japan
[73] Assignee: Yokogawa Electric Works, Ltd., Tokyo, Japan
[22] Filed: June 27, 1972
[21] Appl. No.: 266,600

[30] Foreign Application Priority Data
July 2, 1971 Japan ........................... 46/48559

[52] U.S. Cl. .............................................. 324/60 C
[51] Int. Cl. ........................ G01r 11/52, G01r 27/26
[58] Field of Search ........................ 324/60 C, 60 R

[56] References Cited
UNITED STATES PATENTS
3,629,700  12/1971  Yalof et al. ..................... 324/60 R
FOREIGN PATENTS OR APPLICATIONS
189,935  5/1967  U.S.S.R. ........................ 324/60 C Primary Examiner—Stanley T. Krawczewicz
Attorney—Roland T. Bryan et al.

[57] ABSTRACT

A measuring device for automatically, accurately and rapidly measuring the unknown capacitance and loss tangent of a sample electrical element, and capable of measurement of these parameters in power transmission elements (such as power cable, insulating oil, etc.) under conditions corresponding to those encountered in actual use. The capacitance and loss tangent measuring device provides output signals linearly related to the desired parameters from a circuit which comprises: a power source for imposing selected measuring conditions of current and voltage on the sample element to be measured, an operational amplifier circuit for providing a first voltage which is proportional to the voltage drop across said sample and which has a substantially perpendicular phase relation with said voltage drop, another circuit means for providing a second voltage which is proportional to the current flowing through said sample and which has a substantially parallel phase relation with said current, and an automatic balancing circuit, operating in accordance with the steepest descent method and responsive to the first and second voltages, for deriving by means of synchronous rectifiers and integrators two d.c. output signals from perpendicular components of an intermediate summation signal and for negatively feeding back the output signals to input multipliers receiving the first and second voltages to attain a balanced state in which the two output signals have a linear relationship with the capacitance and loss tangent of the sample element.

12 Claims, 5 Drawing Figures

CAPACITANCE AND LOSS TANGENT MEASURING APPARATUS

BACKGROUND OF THE INVENTION

1. Field of the Invention

The present invention relates to the field of capacitance and loss tangent measuring devices, and more particularly to devices intended for measuring the capacitances and/or the loss tangents of power transmission elements such as insulating oils, power cables, or power capacitors, used as components in power lines.

Power line elements generally encounter high voltage and large power conditions. Ideally, therefore, the measurement of the capacitance and loss tangent of such power line elements should be conducted under electrical conditions corresponding to those encountered in actual use.

2. Description of the Prior Art

The Schering bridge is typical of known prior art devices used for measuring the capacitance and loss tangent of a power line element. To obtain the measurements, however, the Schering bridge requires cumbersome manual adjustment in order to establish bridge balance. In addition, considerable operator skill and experience are essential if an accurate measurement is quickly desired. Because of these problems, devices such as the Schering bridge are not practical for industrial applications where speed, accuracy and measuring ease are important.

SUMMARY OF THE INVENTION

The principal objects of the present invention are to provide a capacitance and loss tangent measuring device which is capable of automatic balancing, which is rapid and accurate, which is easy to operate, and which is capable of performing measurements on power line elements under conditions corresponding to those encountered in actual use.

According to the invention, the automatic measuring of a sample element's parameters of capacitance and loss tangent takes place in a circuit providing two output signals linearly related to capacitance and loss tangent, from which the unknown parameters can be directly read. The circuit comprises a power source for imposing selected conditions of voltage drop across and current flowing in the sample element, means for providing a first voltage which is proportional to the voltage drop across the sample element and which has a substantially perpendicular phase relationship with the voltage drop, and means for providing a second voltage which is proportional to the current flowing through the sample element and which has a substantially parallel phase relationship with the current. The first and second voltages are applied to an automatic balancing means for deriving the two output signals from perpendicular components of an intermediate summation signal and for negatively feeding back said output signals to achieve a balanced or equilibrium state in which the two output signals have a linear relationship with the capacitances and loss tangent of the sample element.

In further aspects of the invention, the balancing means comprises first and second multipliers for multiplying the first and second voltages by first and second negative feedback constants respectively, an adder for producing the intermediate summation signal from three inputs applied through phase-selected impedances from the two multipliers and the means for providing a second voltage means such as synchronous rectifiers for separating the intermediate summation signal into perpendicular components and for converting the components into d.c. signals, and integrators for integrating the d.c. signals and for providing the two output signals to be fed back to the multipliers to provide said negative feedback constants proportional to the output signals.

In other aspects, the means providing the first and second voltages comprise operational amplifier circuits with different arrangements permitting different connections of the sample element to permit duplication of selected conditions.

Other objects, novel aspects, and advantages of the invention will be apparent from the following detailed description taken in conjunction with the accompanying drawings.

DESCRIPTION OF THE PREFERRED EMBODIMENTS

Figure 1:
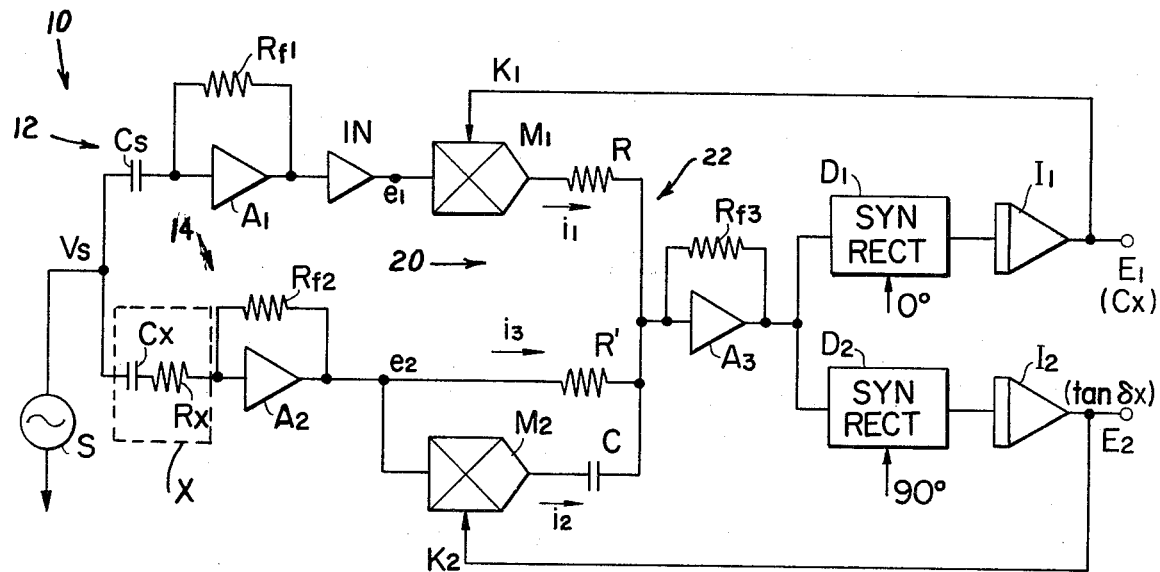
FIG. 1 is a schematic circuit diagram of one embodiment of the invention.

FIG. 1 illustrates a measuring circuit 10 according to the invention which is arranged to be connected to a sample element X to measure its unknown capacitance component $C_x$ and to relate this component and the sample's unknown resistive component $R_x$ to the angular frequency $w$ of the exciting source S in a measurement of the sample's loss tangent $\tan \delta_x = wC_xR_x$.

The source S in measuring circuit 10 is an a-c source of angular frequency $w$ (radians per second) which imposes a selected measuring condition on the sample element X. When necessary to simulate particular use conditions, such as the use of an electrolytic capacitor rated to handle direct current, a direct current may be superimposed on the alternating current of the a-c source S.

The a-c source S supplies a voltage $V_s$ in parallel both to a standard capacitor $C_s$ and to the sample element X. as shown in FIG. 1, an operational amplifier A1, together with the standard capacitor $C_s$, a feedback resistor $R_{f1}$, and a polarity inverter IN, constitute a circuit 12 which converts the current flowing through the standard capacitor $C_s$ into a voltage $e_1$. An operational amplifier A2, together with the capacitor component $C_x$, loss resistor component $R_x$, and a feedback resistor $R_{f2}$, form a circuit 14 which converts the current flowing through the sample element X into a voltage $e_2$.

The voltages $e_1$ and $e_2$ are applied to an automatic balancing circuit 20 comprising multipliers M1 and M2, resistors R and R', a capacitor C, an operational amplifier A3, synchronous rectifiers D1 and D2, a feedback resistor $R_{f3}$, and integrators I1 and I2. The operational amplifier A3, resistors R and R', capacitor C, and feedback resistor $R_{f3}$, constitute a summing circuit 22 whose output is applied through synchronous rectifiers D1 and D2 to integrators I1 and I2. The synchronous rectifiers D1 and D2 separate the output of the operational amplifier A3 into mutually perpendicular components and then rectify these components to provide d.c. voltage signals. The integrators I1 and I2 integrate the d.c. voltage signals of the synchronous rectifiers D1 and D2 to produce output voltages E1 and E2 which, as will be explained below, represent the measured capacitance $Cx$ and loss tangent $\tan \delta x$ respectively. To achieve automatic balancing, the voltages E1 and E2 are negatively fed back to the multipliers M1 and M2 respectively, where they are multiplied by the signals $e1$ and $e2$ from the circuits 12 and 14. The symbols K1 and K2 denote the multiplying constants, proportional to the output voltages E1 and E2 respectively, by which multipliers M1 and M2 multiply the signals $e1$ and $e2$.

Capacitance and loss tangent measuring device 10 operates in the following manner. The summing junction of the two operational amplifiers A1 and A2 serves as a virtual grounding point. The standard capacitor $Cs$ and the sample element X pass such currents as are determined by their impedances and by the voltage $Vs$ impressed on them. The operational amplifiers A1 and A2 produce output voltages proportional to the currents flowing through the capacitor $Cs$ and the sample element X respectively. The output voltage of the operational amplifier A1 is inverted by the polarity inverter IN and is supplied as a voltage $e1$ to the multiplier M1. This voltage $e1$ is multiplied by the constant K1 which is proportional to the voltage E1 being negatively fed back from the output. The product of multiplier M1 is the first input signal $i1$ supplied to the operational amplifier A3 through the resistor R. Similarly, the output voltage $e2$ of the operational amplifier A2 is supplied to the multiplier M2 and multiplied by the constant K2 which is proportional to the voltage E2 being negatively fed back from the output. The product of multiplier M2 is the second input signal $i2$ supplied to the operational amplifier A3 through the capacitor C, which has a perpendicular phase relationship with resistor R. The voltage $e2$ also supplies the third input signal $i3$ to the operational amplifier A3 through the resistor R', which has a parallel phase relationship with resistor R.

The operational amplifier A3 produces an output voltage proportional to the algebraic sum of the three input signals $i1$, $i2$ and $i3$. This output voltage is separated into two mutually perpendicular components and then rectified by the synchronous rectifiers D1 and D2. The integrators I1 and I2 integrate the output voltages from the synchronous rectifiers D1 and D2, and produces d-c output voltages E1 and E2 which keep continuously changing as long as the output voltages of the synchronous rectifiers D1 and D2 stand at values other than zero.

Since the output voltages E1 and E2 are negatively fed back to the multipliers M1 and M2 respectively, the output product voltages of the multipliers change with changes in the output voltages E1 and E2. Thus the algebraic sum of the three signals converges toward zero. When the sum converges into and becomes zero, the output voltages of the synchronous rectifiers D1 and D2 become zero, with the result that the output voltages E1 and E2 of the integrators I1 and I2 cease changing, and balancing circuit 20 reaches balance. Balancing in circuit 20, therefore, follows the method of steepest descent, and is attained accurately and rapidly.

In the balanced state of measuring circuit 10, the voltages $e1$ and $e2$ applied to the multipliers M1 and M2 may be expressed by the following equations, where $j^2 = -1$:

$$e1 = tw \cdot Cs \cdot Rf1 \cdot Vs \tag{1}$$

$$e2 = [jwCx \cdot Rf2/(1+jwCx \cdot Rx)] \cdot Vs \tag{2}$$

The three input signals $i1$, $i2$, $i3$ to the operational amplifier A3 are given as follows:

$$i1 = jwCs \cdot Rf1 \cdot (Vs/R) \cdot K1 \tag{3}$$

$$i2 = [jwCx \cdot Rf2/(1+jwCx \cdot Rx)] \cdot jwC \cdot Vs \cdot K2 \tag{4}$$

$$i3 = -[jwCx \cdot Rf2/(1+jwCx \cdot Rx)] \cdot (Vs/R') \tag{5}$$

Upon attaining balance, the algebraic sum of these currents is zero;

$$i1+i2+i3 = jwCs \cdot Rf1 \cdot (Vs/R) \cdot K1 - [(jwCx \cdot Rf2/1+jwCx \cdot Rx)] \cdot jwC \cdot Vs \cdot K2$$
$$-[jw \cdot Cx \cdot Rf2/(1+jwCx \cdot Rx)] \cdot (Vs/R')$$
$$= 0 \tag{6}$$

Under the condition imposed by Eq. (6), the algebraic sum of the imaginary part as well as that of the real part of the expression must be zero. Therefore the capacitance component $Cx$ and the loss resistance component $Rx$ of the sample may be expressed by the following equations:

$$Cx = (Rf1/Rf2) \cdot (R'/R) \cdot Cs \cdot K1 \tag{7}$$

$$Rx = (Rf2/Rf1) \cdot (CR/Cs) \cdot (K2/K1) \tag{8}$$

Then the loss tangent is given as $$\tan \delta x = wCx \cdot Rx$$
$$= wCR' \cdot K2 \tag{9}$$

In Eqs. (7) and (9), the terms other than $K1$ and $K2$ are known. Hence the capacitance $Cx$ and the loss tangent $\tan \delta x$ of the sample $X$ are given by the multiplying constants $K1$ and $K2$, i.e., the output voltages $E1$ and $E2$ of the integrators $I1$ and $I2$ respectively. Thus, the unknown capacitance and loss tangent of a power line element are available in terms of the two d-c output signals $E1$ and $E2$, which are linearly related to the unknown parameters. The output voltages E1 and E2 of the integrators can be read directly as the measured values by suitably determining the values of the individual circuit constants or by appropriate calibration. The measuring range for values of $Cx$ and $\tan \delta x$ can be extended in steps by changing the resistance values of $Rf1$, $Rf2$, $R$ and $R'$.

Figure 2:
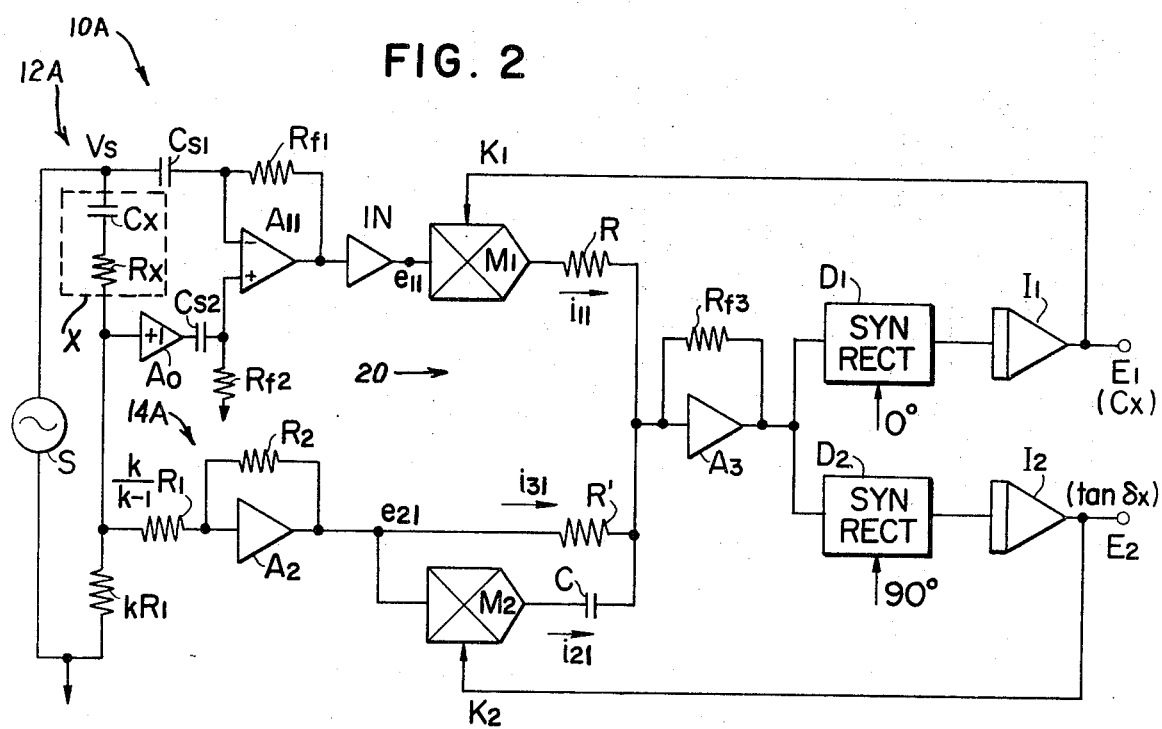
FIGS. 2 through 5 are schematic circuit diagrams showing additional embodiments and modifications of the invention.

FIG. 2 shows another measuring circuit arrangement 10A which is a four-terminal system essentially connected in parallel with sample element X for large current applications to sample element X where measurement under these conditions is desired. In FIG. 2, the symbols S, Cx, Rx etc. represent the same elements described above with reference to FIG. 1. As illustrated in FIG. 2, measuring circuit 10A has modified voltage deriving circuits 12A and 14A for producing voltages e11 and e21 for application to balancing circuit 20.

In measuring circuit 10A, the sample element X is connected across source S in series with a current detecting resistor $k$R1. The value of $k$R1 is selected so as to provide a total parallel resistance of R1 presented by the current detecting resistor $k$R1 and the input resistance $k$R1/($k$−1) of the operational amplifier A2 in circuit 14A providing voltage e21. Since the summing junction of the operational amplifier A2 serves as a virtual grounding point, the input resistance $K$R1/($k$−1) appears to be in parallel with the current detecting resistor kR1 when looking at the circuit from the vantage point of a-c source S. Under this arrangement, the parallel resistance value R1 is equal to the effective current detecting resistance value, and only the effective resistance value R1 is placed in series with source S and sample X.

The modified circuit 12A providing voltage e11 includes a buffer amplifier A$o$ with large input resistance, small output resistance, and a gain of +1, standard capacitors C$s$1 and C$s$2 having the same capacitance, resistors R$f$1 and R$f$2 having the same resistance, a differential type operational amplifier A11 and inverter IN. As shown in FIG. 2, the resistor Rf1 is connected between the output terminal and the inverted (−) input terminal of the differential operational amplifier A11 while the resistor Rf2 is connected between the noninverted (+) terminal of the operational amplifier A11 and ground. The circuit 12A, arranged in this fashion, converts the current flowing through capacitor C$s$1, which current is related to the voltage across the sample, into voltage e11.

Assuming that V$s$ is the a-c voltage impressed on the series circuit of sample X and current detecting resistor $k$R1, the voltages e11 and e21 which are supplied from the circuits 12A and 14A, respectively, to the multipliers M1 and M2 may be expressed by the following equations.

$$e11 = \frac{1+jwCx \cdot Rx}{1+jwCx(R1+Rx)} \cdot jwCs1 \cdot Rf1 \cdot Vs \quad (10)$$

$$e21 = \frac{jwCx \cdot Rx}{1+jwCx(R1+Rx)} \cdot \frac{R2}{\frac{k}{k-1}R1} \cdot Vs \quad (11)$$

These voltages cause the currents i11, i21, i31 to flow into the operational amplifier A3;

$$i11 = \frac{1+jwCx \cdot Rx}{1+jwCx(R1+Rx)} \cdot jwCs1 \cdot Rf1 \cdot \frac{Vs}{R} \cdot K1 \quad (12)$$

$$i21 = -\frac{jwCx \cdot R1}{1+jwCx(R1+Rx)} \cdot \frac{R2}{\frac{k}{k-1}R1} \cdot jwC \cdot Vs \cdot K2 \quad (13)$$

$$i31 = -\frac{jwCx \cdot R1}{1+jwCx(R1+Rx)} \cdot \frac{R2}{\frac{k}{k-1}R1} \cdot \frac{Vs}{R'} \quad (14)$$

When these currents are balanced in balancing circuit 20 described above with reference to FIG. 1, the capacitance and loss tangent of the sample X are determined as:

$$Cx = \left(\frac{k}{k-1} \cdot \frac{Rf1}{R2} \cdot \frac{R'}{R} \cdot Cs1\right) K1 \quad (15)$$

$$\tan \delta x = (wCR') K2 \quad (16)$$

In measuring circuit 10A, therefore, the unknown capacitance and loss tangent are again obtained in terms of the multiplying constants K1 and K2, i.e., the output voltages E1 and E2 of the integrators I1 and I2.

Figure 3:
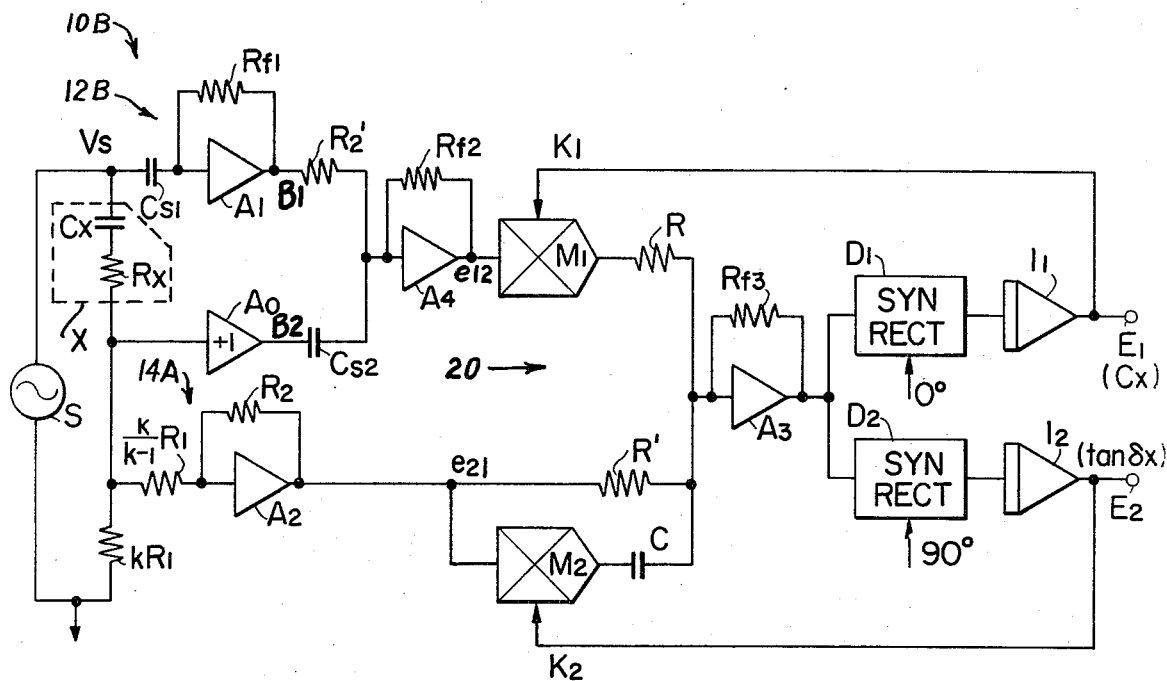

FIG. 3 illustrates another embodiment 10B of the invention which includes a modified circuit 12B for converting the voltage across the sample X into a voltage e12. In circuit 12B, the voltage V$s$ at one end of the sample X is converted into one branch signal B1 by the branch circuit comprising operational amplifier A1, capacitor C$s$1, and resistor R$f$1, and the branch signal B1 is supplied, through a resistor R2′, to an operational amplifier A4 functioning as an adder. The voltage at the other end of the sample X is converted by buffer amplifier A$o$ to another branch signal B2 for application, through capacitor C$s$2, to the operational amplifier A4. The two branch signals B1 and B2 have mutually inverted polarities, and the difference between the two signals, related to the voltage drop across sample X, is given as an output voltage e12 from the operational amplifier A4. When C$s$1=C$s$2 and R2′=R$f$2=R$f$1, the voltage e12 is the same as voltage e11 given by Eq. (10) for the arrangement shown in FIG. 2. Thus in measuring circuit 10B also, the capacitance and the loss tangent of sample X are linearly represented by the output voltages E1 and E2 of the integrators I1 and I2.

Figure 4:
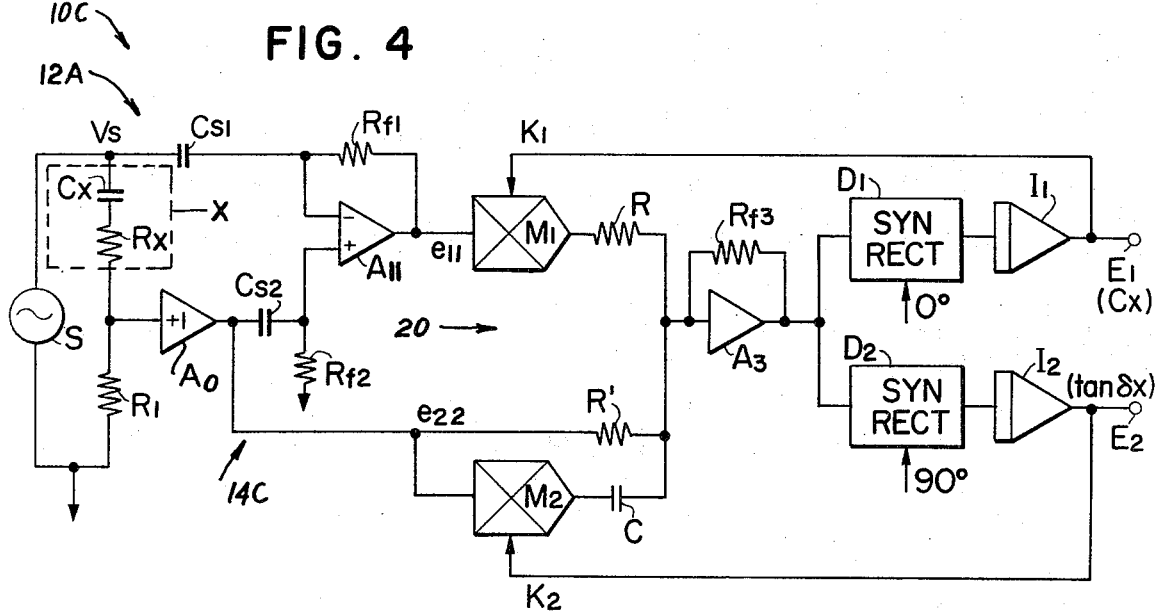
Figure 5:
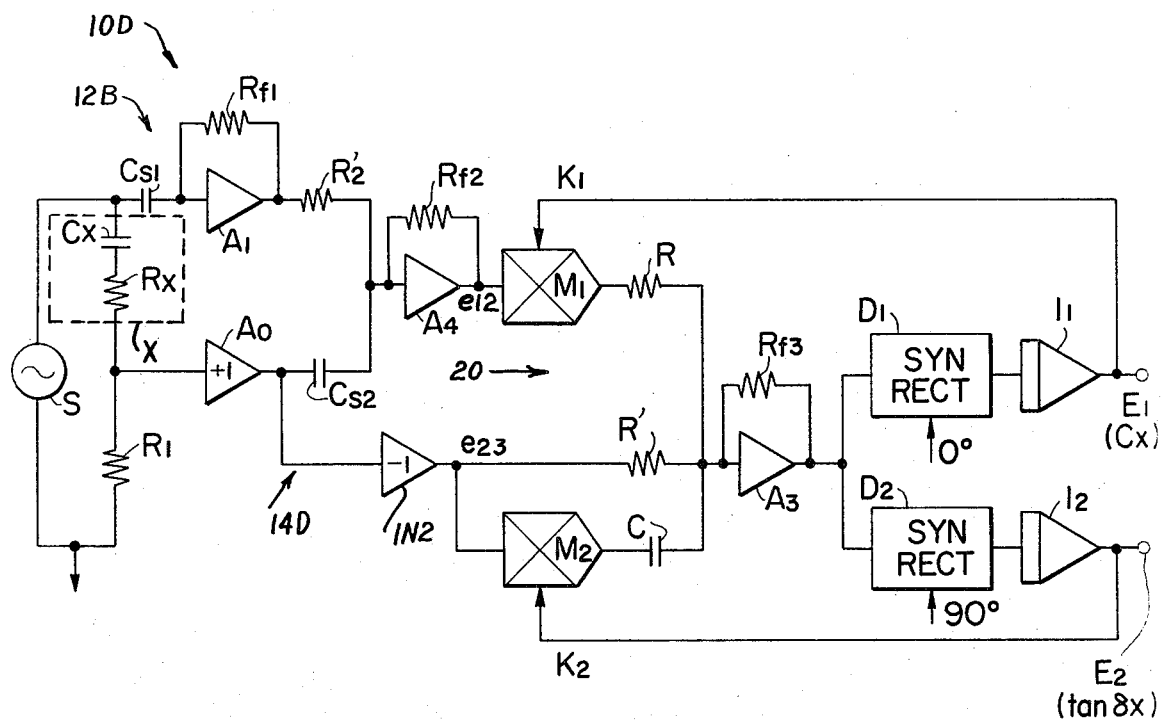

For measurements which can be performed without need for the foregoing four-terminal arrangement of measuring circuits 10A and 10B, the measuring circuit may be modified as shown in FIGS. 4 or 5, by omitting from circuit 14A several elements including operational amplifier A2 with input resistors [$k$/($k$−1)]R1 and feedback resistor R2, and by changing the value of current detecting resistor $k$R1 to a new value of R1.

The modified measuring circuit 10C illustrated in FIG. 4 is similar to measuring circuit 10A illustrated in FIG. 2, employing the same circuit 12A for converting the voltage across sample element X to a voltage e11 as given by Equation (10). The components of circuit 14A, however, are eliminated and the voltage e22 is taken instead in a new circuit 14C from the output of buffer amplifier A$o$. Since buffer amplifier A$o$ has its input connected across current detector resistor R1, its output and voltage e22 will be proportional to the current flowing through sample element X and resistor R1 and will be in phase with this current. Accordingly, the circuit 10C will function similarly to the circuit 10A of FIG. 2 and will provide output voltages E1 and E2 linearly related to capacitance and loss tangent in sample element X.

The modified circuit 10D illustrated in FIG. 5 is similar to circuit 10B illustrated in FIG. 3, employing the same circuit 12B for converting the voltage across the sample element X to a voltage e12. The components of circuit 14A however, are eliminated and a voltage e23 is taken instead in a new circuit 14D from the output of buffer amplifier Ao, through an inverter IN2. Accordingly, circuit 10D functions similarly to circuit 10B and provides output voltages E1 and E2 which are linearly related to the unknown capacitance and loss tangent of sample element X.

As has been described above, the measuring device of the present invention operates on the principle of electronic automatic balance based on the steepest descent method and is capable of measuring the capacitance and loss tangent of a sample element in terms of two d-c output voltages linearly related to the unknown parameters. Functioning in the manner of an automatic Schering bridge, the device of the present invention is highly suitable for the measurement of power line elements under electrical conditions corresponding to those found in actual use.

While the principles of the invention have been described above in connection with specific embodiments, and particular modifications thereof, it is to be clearly understood that this description is made only by way of example and not as a limitation on the scope of the invention.

I claim:

1. A measuring circuit for automatically measuring the capacitance and loss tangent of a sample element and for providing output signals linearly related to said capacitance and loss tangent, comprising:
   a power source for imposing selected conditions of current and voltage upon the sample element;
   means for providing a first voltage which is proportional to the voltage drop across the sample element and which has a substantially perpendicular phase relation with the voltage drop;
   means for providing second voltage which is proportional to the current flowing through the sample element and which has a substantially parallel phase relation with the current; and
   steepest descent balancing means responsive to the first and second voltages for deriving said two output signals, said two output signals being negatively fed back to attain a balanced state in which the two output signals have a linear relationship with the capacitance and loss tangent of the sample element.

2. A measuring circuit as claimed in claim 1 wherein said steepest descent balancing means derives the two out-put signals from perpendicular components of an intermediate summation signal, and negatively feeds back the output signals to multipliers receiving said first and second voltages.

3. A measuring circuit as claimed in claim 1 wherein said balancing means comprises:
   a first multiplier for multiplying the first voltage by a first negative feedback constant;
   a second multiplier for multiplying the second voltage by a second negative feedback constant;
   an adder generating an intermediate summation signal from three inputs, the first input being the output voltage from the first multiplier applied through a first impedance element, the second input being the output voltage from the second multiplier applied through a second impedance element having a substantially perpendicular phase relation with the first impedance element, and the third input being the second voltage applied through a third impedance element having a substantially parallel phase relation with said first impedance element;
   means for separating the intermediate summation signal into two components substantially ninety degrees out of phase and for converting the two components into direct current signals respectively; and integrators for separately integrating the two direct current signals provided by said separating and converting means, the integrator outputs providing said two output signals, said signals being negatively fed back to said multipliers to provide the negative feedback constants in proportion to the output signals, whereby the balancing circuit balances with said two output signals linearly representing capacitance and loss tangent of the sample element.

4. A measuring circuit as claimed in claim 3 wherein said separating and converting means comprises synchronous rectifiers arranged to provide components ninety degrees out of phase.

5. A measuring circuit as claimed in claim 1 wherein the sample element is connected in series with the power source and with the measuring circuit, and wherein the means for providing the first voltage comprises an input capacitor receiving the voltage across the sample element, in series with an operational amplifier with a feedback resistor, in series with an inverter.

6. A measuring circuit as claimed in claim 1 wherein the sample element is connected in series with the power source and with the measuring circuit, and wherein the means for providing the second voltage comprises an operational amplifier with a feedback resistor, connected in series with said sample element, the output of said operational amplifier providing said second voltage.

7. A measuring circuit as claimed in claim 1 wherein the sample element is connected in series with the power source and with a current detecting resistor, and wherein the means for providing the first voltage comprises a differential amplifier with its inputs connected across said sample element, one input being connected to the sample element through a capacitance and the other input being connected to the junction of the sample element and current detecting resistor through a capacitance and a buffer amplifier, the output of the differential amplifier being applied to an inverter to provide the first voltage.

8. A measuring circuit as claimed in claim 7 wherein the means for providing the second voltage comprises an operational amplifier having an input resistance of $kR1/(k-1)$ where the current detecting resistor has a value $kR1$.

9. A measuring circuit as claimed in claim 7 wherein said means for providing the second voltage comprises means connected to the output of the buffer amplifier. Kr 10. A measuring circuit as claimed in claim 1 wherein said sample element is connected in series with said power source and with a current detecting resistor, and wherein the means for providing the first voltage comprises an adder, means for providing a first branch signal applied to the adder including an operational amplifier and a capacitor connected to one end of said sample element, and means for providing a second branch signal for application to the adder including a capacitance and a buffer amplifier connected to the other end of said sample element at the function of the sample element and current detecting resistor, whereby the output of the adder provides said first voltage.

11. A measuring circuit as claimed in claim 10 wherein the means for providing the second voltage comprises an operational amplifier having an input resistance of $kR/(k-1)$ where the current detecting resistor has a value $kR1$.

12. A measuring circuit as claimed in claim 10 wherein the means for providing the second voltage comprises means connecting the output of the buffer amplifier, and an inverter, the output of the inverter providing the second voltage.

* * * * *

UNITED STATES PATENT OFFICE
CERTIFICATE OF CORRECTION

Patent No. 3,766,469  Dated October 16, 1973

Inventor(s) HISAO NAKANE

It is certified that error appears in the above-identified patent and that said Letters Patent are hereby corrected as shown below:

Column 5, line 53

Reads:
$$\text{"}e21 = \frac{jwCx \cdot Rx}{1+jwCx(R1+Rx)} \cdot \frac{R2}{\frac{k}{k-1}R1} \cdot Vs$$

Should Read:
$$--e21 = -\frac{jwCx \cdot Rx}{1+jwCx(R1+Rx)} \cdot \frac{R2}{\frac{k}{k-1}R1} \cdot Vs$$

Column 8, line 62    Delete "Kr"

Signed and sealed this 23rd day of April 1974.

(SEAL)
Attest:

EDWARD M. FLETCHER, JR.
Attesting Officer

C. MARSHALL DANN
Commissioner of Patents